United States Patent
Sami et al.

(10) Patent No.: US 7,688,725 B2
(45) Date of Patent: Mar. 30, 2010

(54) CONTENT-AWARE CONGESTION CONTROL SYSTEM

(75) Inventors: Muhammad Rehan Sami, Dubai (AE); Abdul Waheed, Santa Clara, CA (US); Sadiq Sait Mohammad, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 318 days.

(21) Appl. No.: 11/672,155

(22) Filed: Feb. 7, 2007

(65) Prior Publication Data

US 2008/0186852 A1    Aug. 7, 2008

(51) Int. Cl.
*G01R 31/08* (2006.01)
(52) U.S. Cl. .................. 370/230; 370/389; 370/466
(58) Field of Classification Search .......... None
See application file for complete search history.

(56) References Cited

U.S. PATENT DOCUMENTS

| 2003/0053464 A1* | 3/2003 | Chen et al. ......... 370/400 |
| 2006/0182127 A1* | 8/2006 | Park ............... 370/400 |
| 2006/0239188 A1* | 10/2006 | Weiss et al. ......... 370/229 |
| 2008/0175148 A1* | 7/2008 | Todd et al. ......... 370/235 |

* cited by examiner

*Primary Examiner*—Jayanti K Patel
*Assistant Examiner*—Jung Park
(74) *Attorney, Agent, or Firm*—Lowe Hauptman Ham & Berner, LLP

(57) ABSTRACT

A content-aware congestion control scheme for software MPLS routers enables the MPLS routers to discard packets with less important content when there is congestion in the network. By employing such content-aware congestion control, the overall quality of multimedia content is not significantly affected, enabling graceful degradation of quality using a Wavelet based compression technique. The MPLS router marks wavelet-based compressed multimedia packets as those containing important or less important contents of compressed and encoded frames. Such markings enable the MPLS router to make decisions according to the packet's priority. At times of congestion, this router restricts the rate of outgoing low priority traffic to allow high priority streams to maintain a gracefully degraded QoS for compressed multimedia content.

10 Claims, 3 Drawing Sheets

CONTENT-AWARE CONGESTION CONTROL SYSTEM

FIELD OF THE INVENTION

This invention relates to a load-shedding based congestion control system and more particularly to a content-aware congestion control system for multi protocol label switching (MPLS) routers.

BACKGROUND FOR THE INVENTION

An increase in web surfers, requests for quality of service (QoS) and service availability has led to an increased demand for transmitting a packet of information from a source host to a destination host. For such purposes the multi protocol label switching (MPLS) has become the standard in internet engineering. The multi protocol field switching (MPLS) is a signaling protocol for exchanging label information generated from routing information and defines a process for generating and deleting a label and for passing a pre-determined packet through a traffic-engineering path by allocating traffic information for traffic engineering and explicit path information to a label.

Multi protocol label switching (MPLS) simplifies forwarding functions and provides traffic-engineering functions for improving transmission speed and quality of service (QoS) and for responding to data the multi protocol label switching (MPLS) is widely applied in the surroundings of high-speed switching networks such as asynchronous transfer mode (ATM) switching networks or frame relay networks.

A traffic engineering scheduling device for multi protocol label switching (MPLS) is disclosed in a United States Patent Application Publication of Song (US 2003/0137983). As disclosed therein, the device comprises a traffic-engineering profile module for receiving and processing subscriber information including a traffic-engineering path. Information relating to the traffic-engineering path, a traffic-engineering scheduling module, a time attributed property for generating/modifying/deleting the traffic-engineering path and making the traffic-engineering profile module generate/modify/delete the traffic-engineering path. The module also includes a signaling protocol control module controlling a signaling protocol for constructing a routing path, and performing generation/modification/deletion of the traffic-engineering path according to request of the traffic-engineering profile module. Therefore, it is possible to develop a communication product or data service changing dynamically the service quality or contents depending on time. As a result various types of communications products can be developed and various services can be supplied to subscribers. The telecommunications carrier can maximize efficiency in the network in itself, and even in the marketing fields for the network.

A method for sending data packets through a multi protocol label switching (MPLS) network and a MPLS network is disclosed in a Patent Publication (US 2003/0053464 of Chen et al. As disclosed therein a method of sending data packets to a multi protocol label switching (MPLS) network is provided. It comprises assigning to each packet a quality of service (QoS) class flag, then routing each packet through the MPLS network depending on the QoS class flag assigned.

A U.S. Pat. No. (6,314,095) of Loa discloses a method and apparatus for a high-speed multi media content switch with compressed internet protocol (IP) header. An IP packet is retrieved having a header and a payload. The header of the IP packet is compressed. The payload is appended to the compressed header to create a compressed IP packet. A multi protocol label switch (MPLS) virtual circuit is established through a plurality of IP routers terminating at a destination of the IP packet. The compressed IP packet is converted into a MPLS packet. The MPLS packet is transmitted through the MPLS virtual circuit. The MPLS packet is reconverted into the compressed IP packet at the destination. The compressed IP packet is compressed at the destination.

Compression techniques essentially reduce the size of data to be delivered and hence reduce the amount of bandwidth required to deliver this content. Standard compression techniques such as Motion Picture Expert Group—MPEG Standard provide Discrete Cosine Transform (DCT) based lossy compression. Playback of compressed video using DCT does not tolerate losses of parts of the compressed frames due to network congestion and quality of playback becomes unacceptable.

Wavelet based techniques provide an alternative compression methodology. These techniques are non-standard but can provide graceful degradation when parts of compressed data frames are dropped due to congestion. Such techniques can identify parts of the compressed frames that can be dropped under congestion without appreciable loss of quality.

The difference between DCT and Discrete Wavelet Transform (DWT) is that in the wavelet transform, the process is performed on the entire image and the result is a hierarchal representation of the image, where each layer is a frequency band. Using DWT techniques, some of the high frequency contents can be dropped with minutely perceptible degradation of decompressed image quality. In the worst case, low frequency bands of compressed images can help restore a coarse grain representation of an original image. Due to this characteristic, graceful degradation of image quality using DWT based compressed data is an ideal candidate to test load shedding based congestion control schemes.

The idea of Embedded Image Coding using Zerotrees of Wavelet Coefficients (EZW) was presented by Shapiro. The EZW coder exploits the above mentioned characteristic of DWT technique. It applies wavelet transformation and heuristics such that the encoded data is ordered in terms of visual significance. The encoded data is disseminated as an embedded bit-stream with the data in descending order of significance. The degradation of visual quality, as a result of not sending data of low-significance, can be managed so that the resulting decoded image is still useable by the user and the application.

MPLS is a layer 3 switching technology that emphasizes the improvement of packet forwarding performance of backbone routers. The main idea behind MPLS technology is to forward packets based on a short and fixed length identifier termed as a "label" rather than the layer 3 IP addresses of the packets. The labels are assigned to each packet at the ingress node known as the Label Edge Router (LER) of an MPLS Domain.

MPLS routers make forwarding decisions based on the fixed length labels. The labels are detached as packets depart an MPLS domain at the egress LER. Within the MPLS domain, packets are forwarded using these labels by-the core Label Switch Routers (LSRs). The IP packets are switched through pre-established Label Switched Paths (LSP) by signaling protocols. LSPs are determined at the ingress LER and are unidirectional (from ingress to egress). Packets with the identical label follow the same LSP and are categorized into a single Forwarding Equivalence Class (FEC). An FEC can be defined as a group of IP packets, which are forwarded in the same manner along the same LSP.

A main point of interest with FECs in a traffic engineering context is that they support aggregation. All packets from different sources but entering the MPLS domain through the same LER, and bound to the same egress LER can be assigned to the same FEC and therefore the same virtual circuit. In other words, there is no need to establish a new virtual circuit for each (source, destination) pair read in the headers of incoming packets. Once ingress LER has determined the FEC of a packet, the ingress LER assigns a virtual circuit to the packet via a label number. Also, FEC definitions can take into consideration IP packet sources in addition to destinations. Two packets that enter the MPLS domain through the same LER and going to the same destination can use different sets of links so as to achieve load balancing, that is, put the same amount of traffic on all links thereby distributing the load of traffic on each link.

Traffic engineering deals with the performance of a network in supporting users' QoS needs. Traffic engineering for MPLS networks involves the measurement and the control of traffic. The objectives of traffic engineering in the MPLS environment are related to two performance functions:

1. Traffic oriented performance which includes QoS operations.
2. Resource oriented performance objectives which deal with networking resources to contribute to the realization of traffic oriented objectives.

The aim of traffic engineering is to find mechanisms to satisfy the growing need of users for bandwidth; thus, the efficient management of the available bandwidth is the essence of traffic engineering. MPLS plays an important role in engineering the network to provide efficient services to its customers. The advantages of MPLS for traffic engineering include:

1. Label switches are not limited to conventional IP forwarding by conventional IP based routing protocols.
2. Traffic trunks can be mapped onto label switched paths.
3. Attributes can be associated with traffic trunks.
4. MPLS permits address aggregation and disaggregation (IP forwarding permits only aggregation)
5. Constraint-based routing is easy to implement.
6. MPLS hardware is less expensive than ATM hardware.

Proper traffic engineering techniques are the basis of providing good QoS support to MPLS networks.

Three main factors determine the performance of any network application, namely the supporting system, network and the protocol. Considering the architectural philosophy of IP, it imposes a restriction in that it does not support a fixed data flow model upon the network's application set. It does not take into consideration the "type" of traffic to route. It merely routes the traffic based on simple routing algorithms (mostly shortest path). In such cases, delay sensitive traffic can have an impact due to excessive injection of delay insensitive traffic because all types of traffic follow the same shortest path. This can be a drawback for multimedia traffic due to its time stringent nature. Another disadvantage of conventional IP routing is the amount of processing the core routers have to perform in order to forward a packet to its destination. In L3 (IP) routing, the network does not maintain state, the data packets following the first packet in a flow are unaware of its routing. Hence the route is calculated independently for every packet although they have the same destination address. MPLS improves these shortcomings in IP routing by combining L3 routing with L2 switching. It uses the first data packet to establish the LSP, and distributes a label to the FEC that the first data packet belongs to. If the data packets following the first one belong to the same FEC as the first data packet, then MPLS uses the same label to encapsulate them. Forwarding decisions are made on the basis of the fixed length short labels rather than the variable length IP header and longest prefix matches. This considerably reduces the processing time and in turn increases the core network's packet forwarding performance.

FIG. 1 shows the MPLS Shim Header. This header contains the actual label that is inserted between the layers 2 and 3 headers. The header is 32 bits long. It is worth noting here that the 3 experimental bits are marked as EXP. These bits are used to map the DiffServ Code point (DSCP) from the IP packet to the MPLS header to maintain QoS in a DiffServ MPLS environment.

These EXP bits are used to map certain information encoded within the multimedia packets onto the MPLS header so that the MPLS router has ample information and can decide on the basis of this information whether to discard a packet at times of congestion or not.

BRIEF SUMMARY OF THE INVENTION

It is an object of the present invention to provide graceful degradation of quality of EZW based compressed multimedia data when transmitted over an MPLS based network.

To attain this objective, intelligence is built into the MPLS router to identify packets of high and low priorities by implementing a method of reading priority information from the packet's header, mapping it onto the 3 EXP bits and reading these bits throughout the MPLS core.

It is also an object of the present invention to utilize available network resources efficiently by employing a load-shedding based technique. The intelligence in the router makes it capable of restricting less important data to be transmitted such that under network congestion, available bandwidth is utilized only by higher priority packets enabling the service provider to make best use of whatever is available from the pool of resources.

In essence the present invention contemplates a content aware control system for multi protocol label switching (MPLS) routers. The system includes a multi protocol label switching (MPLS) router for encapsulating a regular internet protocol (IP) packet with a multi protocol label switching (MPLS) header, changing an incoming label to an outgoing label according to a preconfigured switching table and removing labels at the edge of a network. The system also includes means for prioritizing internet protocol (IP) packets and for making forward decisions during periods of network congestion.

A preferred embodiment of the invention contemplates a content-aware congestion control system for multi protocol label switching (MPLS) routers which includes means for segregating packets with less important content and means for detecting congestion on the internet. The system further includes means enabling graceful degradation of quality of segregated packets using a wavelet based compression technique. In addition, the system includes means including a multi protocol label switching (MPLS) router for making wavelet based compressed multi media packets, to make decisions according to the packets priority at times of congestion and means for restricting the rate of lower priority outgoing traffic streams to maintain a gracefully degradated quality of service (QoS) for compressed multi media control.

The invention also contemplates a content-aware congestion control method for a software MPLS router, which includes the steps of analyzing all incoming packets from an interface for packet payload and information in a packet header; establishing a predetermined policy for prioritizing packets; classifying packets based on mark values from a control-aware routing module; directing packets carrying high priority multi-media packets to a highest priority queue, packets carrying low priority multi-media packets to second highest priority queue and remaining traffic to a least priority queue; creating label switched paths (LSPs) on an outgoing interfaced; assigning appropriate labels and different experimented (EXP) bit values to three different flows of traffic; identifying priorities for said three flows of traffic; and removing a multiple protocol label switching system (MPLS) header from said packets and forwarding said packets to an internet protocol (IP) link based on a destination internet protocol (IP) address.

DESCRIPTION OF THE PREFERRED EMBODIMENTS OF THE INVENTION (A) MPLS Routers Operations An MPLS router performs three main functions: pushing of a label (encapsulating a regular IP packet with MPLS header), swapping the label (changing incoming label to outgoing label according to preconfigured switching table) and popping label (removing label at the edge of the network). The present invention enhances these three functions of an MPLS router in such a way that it makes the router intelligent enough in making forwarding decisions under network congestion. The scheme is implemented to serve a wide range of loss-tolerant, real-time applications as well as images whose content can be dropped under congestion (graceful degradation).

Figure 1:
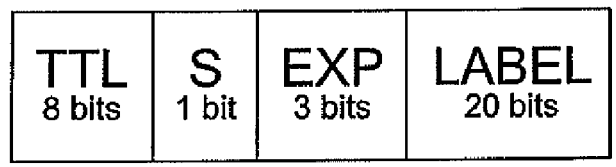
FIG. 1 shows the 32 bit long MPLS shim header.

One of the problems related to MPLS, is how to map packets onto forwarding equivalence classes. As shown in FIG. 1, the MPLS shim header contains the actual label that is inserted between the layers 2 and 3 headers. The header is 32 bits long. It is worth noting the 3 experimental bits, marked as EXP. These bits can be used to map certain priority information encoded within the multimedia packets onto the MPLS header.

(B) End-to-end Flow of the Present Invention

Figure 2:
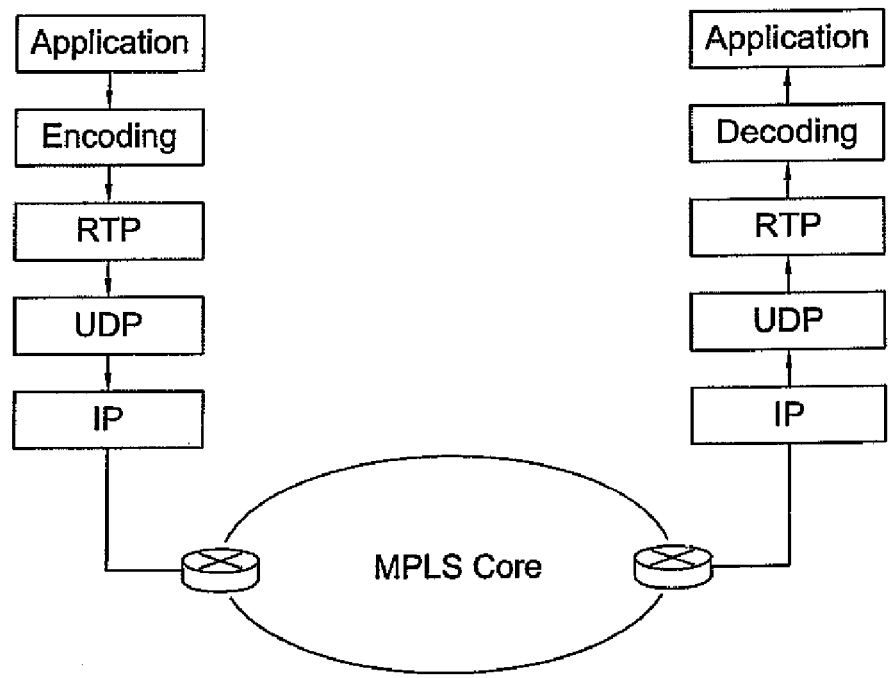
FIG. 2 shows the end-to-end flow of the present invention.

The present invention has end-to-end flow as shown in FIG. 2. At the sending end, application generates raw multimedia content that is encoded using EZW technique. Packetization is performed by encapsulating the content with appropriate headers and packet priority is assigned at the application and sent on to the network via the MPLS router. The MPLS router checks the packet's priority and encodes priority information in the MPLS header with the relevant EXP bit value. At the receiving end, again the MPLS router (egress) removes the MPLS header and sends the packet- to the upper layers for de encapsulation. Headers are removed and the decoder decodes the content and finally the application displays the content. This scheme works well with a pure end-to-end MPLS network. The same methodology can be applied to a mix of IP and MPLS network where packet encapsulation/dc-encapsulation will be done at every demarcation point between an MPLS domain and an IP network.

(C) Packet Ordering and Prioritization

Figure 3:
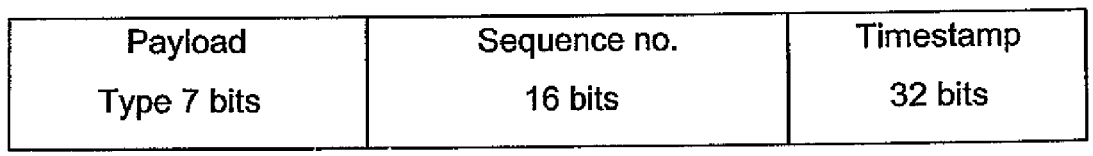
FIG. 3 shows the relevant fields inside an RTP header.
Figure 4:
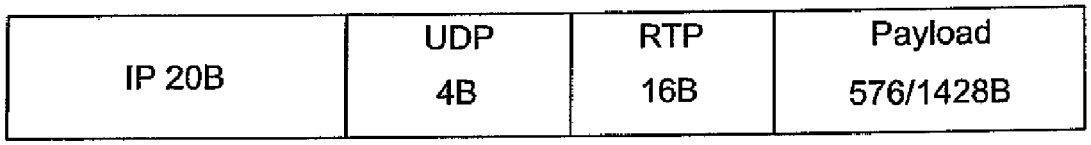
FIG. 4 shows packet format of multimedia packet containing EZW compressed data.

The main idea is to treat a particular class of traffic differently. This implies that there must be some sort of packet identification scheme built within the router in order to classify packet on the basis of type. Given that multimedia streaming is a real-time application and that the compression algorithm encodes bits ordered in importance, the Real Time Protocol (RTP) is used as the transport protocol. Apart from the real-time nature of most of the multimedia content, another motivation is to use UDP as the underlying transport protocol since UDP has proven to be a better solution in transferring wavelet encoded images. The payload type field in the RIP header is used to uniquely identify EZW encoded files. The sending application marks high priority packets with a unique payload type value and the low priority packets with another. The fields in use and the ones that can be used for more complicated real-time applications are shown in the FIG. 3.

Since the EZW compression component decomposes an image into different frequency bands and generates bits ordered in importance, sequence numbers assigned to packets represent this order. A video clip may contain many frames, and within each frame there could be many frequencies (both important as well as less significant). So for an average long video clip, if there are n frames each with f different frequency components, where fi are the high priority frequency bands and fj are the low priority bands, then n can be defined as a set of j and fi and a video clip is a sequence of nJ and fi. From this it can be stated that sequencing of packets will replicate this order of importance and after every complete set of fh and J the sequencing of packets will restart for the next n. From here, it is clear that the sending application will follow the generation of packets as a prioritization scheme. In a total of n packet generation, first n/2 packets can be considered high priority packets and the rest low priority.

(D) EXP Bits Encoding Scheme

Figure 5:
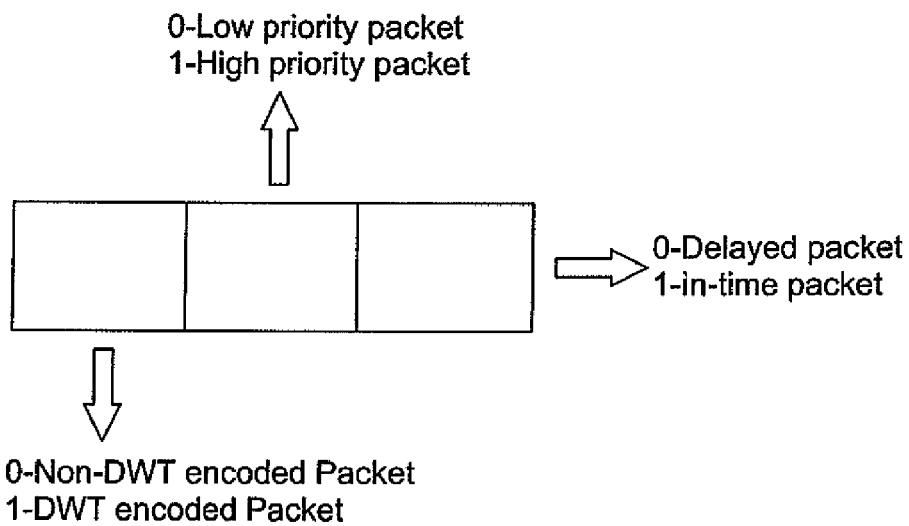
FIG. 5 shows the EXP bits encoding scheme used to map priority information from the packet's header to the EXP field in the MPLS header.
Figure 6:
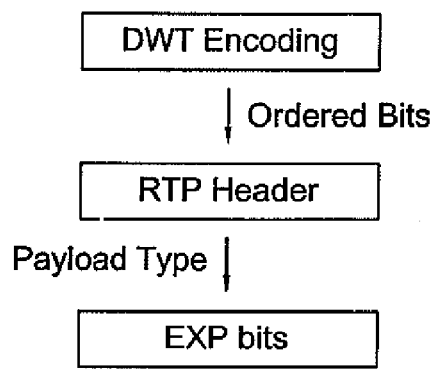
FIG. 6 shows the flow of priority information all the way from the compression application to the MPLS header.

FIG. 5 illustrates the EXP bit encoding scheme that has been designed for encoding packet's priority information onto the 3 EXP bits in the MPLS header. If the first bit is set to 0, then there is no need to check further as the packet is not a packet containing EZW encoded content. If it is 1, then check for the next bit. If the second bit is 0, then the packet is of low priority and is suitable to drop under congestion. If it is 1, then the packet is of high priority and cannot be dropped even under severe congestion. If the third bit is 0, the packet is delayed and is of no use any longer. This implies that it can be dropped at any time. If it is 1, then the packet is in time and has to be forwarded. Keeping this bit scheme in mind, there are only two values for the EXP field that will be used for packet prioritization by the router: 7 and 5.

(E) Content-aware Software MPLS Router's Operations

The ingress router determines the priority of a particular multimedia packet when it pushes the MPLS header at the edge. Router analyzes the header, and according to the value of the payload type field in the RTP header, it assigns EXP field value 7 to high priority packets and 5 to lower ones. At the core backbone, the label switch routers need not read the transport layer header, instead they will just check the EXP field value in the MPLS header and queue them according to their respective priorities.

Priority queues are used instead of the regular FIFO queues for buffer management at the router's interface. A priority queue is an m-level queue where m is configurable. Specifically, it consists of m FIFO queues. The level 0 queue has the highest priority while the level (m-i) queue has the lowest. When a packet arrives, the packet is classified into one of the m levels and is put in that FIFO queue.

Figure 7:
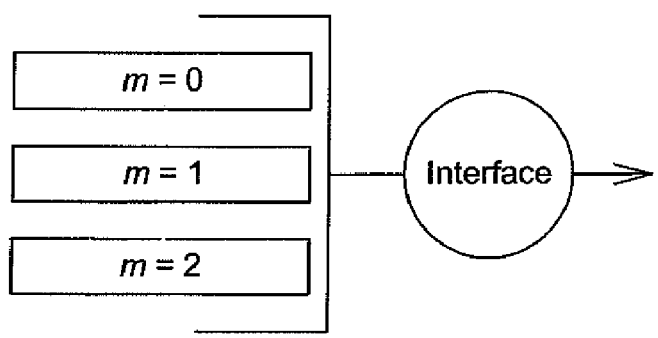
FIG. 7 shows structure of the priority queue at the router for buffer management.

For the present invention, m 3, level 0 queue is the highest priority queue and all multimedia packets containing BZW encoded data with EXP bits set to 7 are assigned to this level. Level 1 is the next higher priority queue to which all other packets are assigned. Low priority multimedia packets with EXP bits set to 5 are assigned to level 2. This is done to ensure that multimedia traffic does not cause rest of the network traffic to starve. At times of congestion packets belonging to queue 0 have the privilege to be forwarded to the outgoing interface whereas packets belonging to queues 1 and 2 are treated with lesser importance. FIG. 7 shows the logical structure of the buffer at the router.

In order to maintain further fairness among the three levels of the priority queue; Stochastic Fairness Queue (SFQ) is also implemented. Traffic is separated into conversations and packets are de-queued in a round-robin fashion ensuring that no single conversation completely swamps the queue.

(F) Queuing and Buffer Management

Traditional software routers use pure FIFO queues to manage buffers. The present invention uses the PRIO queuing discipline. The PRIO qdisc doesn't actually shape, it only subdivides traffic based on the configuration of filters. When a packet is enqueued to the PRIO qdisc, a class is chosen based on the filter commands. By default, three classes are created. These classes by default contain pure FIFO qdiscs with no internal structure, but can be replaced by any qdisc available.

Whenever a packet needs to be de-queued, class 1 is tried first. Higher classes are only used if lower bands all did not give up a packet. This qdisc is very useful in case certain kind of traffic is to be prioritized without using only TOS-flags.

As stated above, SFQ queuing discipline is also used to maintain fairness and avoid starvation of least priority traffic. This is a useful queuing discipline when dealing with very full queues, and especially combined with a classful queue discipline. Traffic is separated into conversations and packets are de-queued in a round-robin fashion ensuring that no single conversation completely swamps the queue. It is a classless queuing discipline.

SFQ is a simple implementation of the fair queuing algorithms family. It's less accurate than others, but it also requires fewer calculations while being almost perfectly fair. The keyword in SFQ is conversation (or flow), which mostly corresponds to a TCP session or a UDP stream. Traffic is divided into a pretty large number of FTFO queues, one for each conversation. Traffic is then sent in a round robin fashion, giving each session the chance to send data in turn. This leads to very fair behavior and disallows any single conversation from drowning out the rest. SFQ is called 'Stochastic' because it doesn't really allocate a queue for each session; it has an algorithm which divides traffic over a limited number of queues using a hashing algorithm.

(G) Logical Structure of Content-Aware Software MPLS Router

The present invention significantly differentiates with current QoS architectures as it employees only MPLS for TB and QoS. The logical architecture of the software MPLS router with the current invention is independent and does not involve assimilation of other technologies. Just like any other MPLS router, the content-aware software MPLS router has 3 modes of operation: as ingress, switch or egress router. In all of these 3 modes, the router is carefully programmed to differentiate, prioritize, and then apply specific MPLS operations on the packets based on classification and prioritization.

Figure 8:
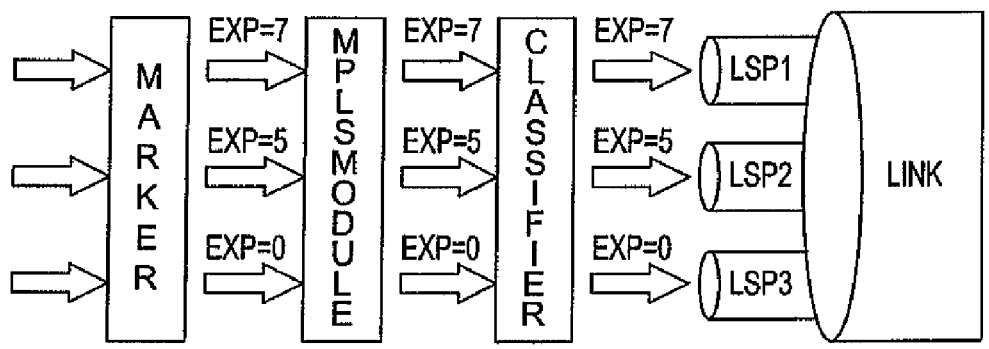
FIG. 8 shows logical modules and their interaction when the MPLS router is in ingress mode.

In the ingress mode, the software router has three main modules that perform content-aware MPLS routing. FIG. 8 shows the internal logical structure of the software router and the different modules and their relationship.

The Marker is the module that takes all incoming packets from the incoming interface and then analyzes packet header and marks packets on the basis of some predefined policy. The Marker basically looks at the value of the payload type field in the RTP header and then marks packets and passes them to the next module.

The application that compresses and sends multimedia packets from a remote server to the requesting client divides the stream into two halves and assigns a unique value in the payload type field of the RTP header for each packet of both the streams. Since the encoding algorithm is arranging bits in descending order of importance, packets in the first half of the stream are high priority packets and have a value 95 set into the payload type field in the RTP header. The second half contains low priority packets and RTP payload type field value is set to 96. These values are not used for standard applications according to RFC 1889.

Once packets received at the ingress interface, the Marker strips the RTP header and analyzes the value in the payload type field. If the value is 95, it marks the packet with a unique identifier (an integer value of 1). If the value in the payload type field is 96, it marks the packet with the other unique identifier (2) and if the packet is a non-EZW application generated one, it marks it with a "don't care".

Based on the marks on the packets from the Marker, the Classifier module performs all the queuing functions at the egress interface of the router. It implements the PRIO and SFQ queuing disciplines as described above. The Classifier creates three priority queues, one for each flow of traffic. Each queue has a class that identifies the turn it gets for dequeuing packets. As mentioned above, all packets with a mark 1 (high priority multimedia packets) are queued in the class 1 priority queue. Packets marked with a don't care are queued in class 2 and the low priority multimedia packets that are marked with 2 are queued in class 3.

In order to maintain fairness among the three flows of traffic, the Classifier also implements the SFQ queuing discipline. The SFQ discipline prevents low priority flows from starvation as it checks after a fixed amount of time whether any higher priority flow is eating up all the resources.

Finally, the MPLS module creates LSPs on the outgoing interface and assigns appropriate labels and EXP bits values to outgoing traffic. As mentioned above, high priority multimedia packets will be encapsulated in MPLS header with EXP bits set to value 7, whereas packets containing less important data will be assigned EXP bits equal to 5, this module implements this core feature of the content-aware software router. Once the packets are marked and classified by the first two modules, the MPLS module knows exactly what packets will be assigned what EXP value and forwarded on which LSP. All the packets marked 1 (high priority multimedia packets) by the Marker module and classified by the Classifier are encapsulated with MPLS header carrying EXP bits set to 7 and forwarded on the appropriate LSP.

Figure 9:
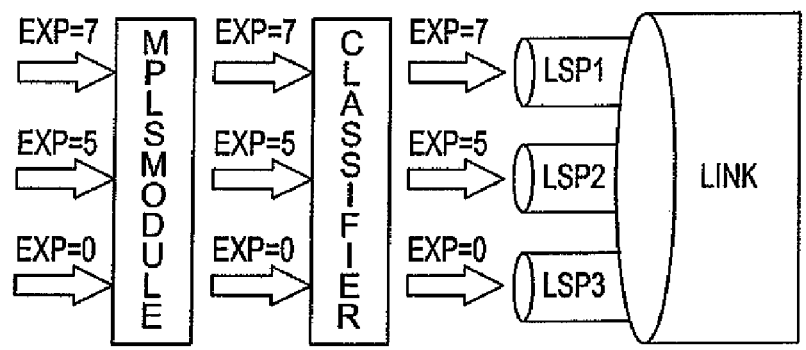
FIG. 9 shows logical modules and their interaction when the MPLS router is in switch mode.
Figure 10:
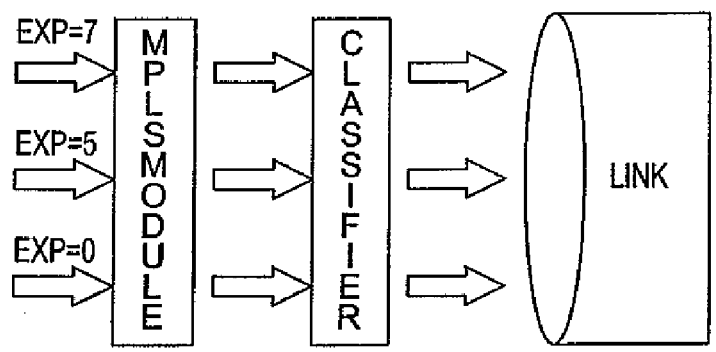
FIG. 10 shows logical modules and their interaction when the MPLS router is in egress mode.

The switch mode is kept simple and scalable to maintain the useful fast forwarding paradigm of MPLS. In this mode there are only two modules that perform content-aware MPLS switching. In fact the switch router is unaware of the content of the packets it has to switch. It only relies on the information provided to it by the ingress or the previous switch router in the network. FIG. 9 shows the ingress mode of the software MPLS router.

The MPLS module, in the FIG. 9, analyzes, for every incoming packet, the MPLS header and reads the EXP bits value. According to the value received, for every pre defined flow, the module marks the FEC and then delivers the packets to the next module.

The function of the Classifier Module is exactly the same as the one in ingress mode. Based on the mark value received from the MPLS Module, the classifier classifies and queues packets in accordance with their respective priorities. It is clear from FIG. 9 that the EXP bits value is maintained between the two modules.

At the egress, the router finally removes the MPLS header and forwards the packet to the IP link. But before doing so, the router maintains the priorities of the FECs. This is the last mile of the end-to-end MPLS QoS using content-awareness. A congested IP link beyond this point will not maintain the priorities assigned by the MPLS ingress.

In the egress mode, just like the switch mode, there are also two modules, the only difference is that now, the router removes MPLS header and forwards packet based on destination IP address instead of assigning label and maintaining EXP bits value.

(H) Practicality of the Invention

In case of the Internet, there are several issues that pose non-trivial problems such as scalability, compatibility and interoperability. The present invention is well suited for small to medium sized enterprise networks that comprise of a single managed domain with end-to-end MPLS backbone. Hence, Enterprise Data Networks (EDNs) are most suitable candidates for implementing the content-aware congestion control since the content provider (CP) and content service provider (CSP) are managed and administered by same authorities. Data applications can generate EZW compressed multimedia content and the MPLS backbone can be made content-aware congestion control enabled to utilize the compression technique and provide EDN users with optimum quality content even when the network backbone is congested due to other application data on the backbone.

While the invention has now been disclosed in connection with it's preferred embodiments, it should be recognized that changes and modifications may be made without departing from the scope of the appended claims.

What is claimed is:

1. A content-aware congested control system for multiple protocol label switching (MPLS) routers, said system comprising:
    a multiple protocol label switching (MPLS) router for encapsulating a regular internet protocol (IP) packet with a multiple label switching (MPLS) header and wherein the function of removing labels is executed at said egress edge router;
    means for changing an incoming label to an outgoing label according to a preconfigured switch table and removing labels at an edge of a network;
    means for classifying and marking internet protocol (IP) packets based on the actual content of a payload and for making forwarding decisions during periods of network congestion;
    in which said means for prioritizing internet protocol (IP) packets includes means for discarding packets with substantially less important content and for enabling graceful degradation of quality;
    in which said means for discarding packets with less important content incorporates a wavelet based compression technique;
    in which a marking scheme for identifying high priority and low priority multi-media packets is indefinite of differentiated services (DiffServ) marking and relying solely on multiple protocol label switching (MPLS);
    in which said content-aware congestion control system is implemented in an ingress mode, a switch mode and an egress mode;
    in which said ingress mode comprises a marker or content aware routing module, a classifier or Quality of service (QoS) module and the multiple protocol label switching module; and
    in which said content aware routing module includes means for analyzing all incoming packets from the interface for packet payload from the information in the packet header and means for marking packets on the basis of a pre-determined policy.

2. A content-aware congested control system for multiple protocol label switching (MPLS) routers said system according to claim 1 in which said quality of service module performs all queuing functions at the egress interface of said router by priority (PRIO) queuing and stochastic queuing (SFO) discipline and means for classifying packets on the basis of mark values from said content-aware routing module.

3. A content-aware congested control system for multiple protocol label switching (MPLS) routers according to claim 2 wherein said quality of service (QoS) module creates at least three priority queues namely, a highest priority queue, a second highest priority queue and a least priority queue and implements classification rules thereby directing packets carrying high priority multi-media packets to said highest priority queue, packets carrying low priority multi-media packets to said second highest priority queue and the rest of the traffic to said least priority queue.

4. A content-aware congested control system for multiple protocol label switching (MPLS) routers according to claim 1 in which the multiple protocol label switching module creates label switched paths (LSPs) on an outgoing interface and assigns appropriate labels and different experimented (EXP) bit values to three different flows of traffic and to identify priorities for said three flows of traffic.

5. A content-aware congested control system for multiple protocol label switching (MPLS) routers according to claim 1 in which multiple protocol label switching network (MPLS) module analyzes every incoming packet and said multiple protocol label switching (MPLS) header reads the experimented (EXP) bit value for every predetermined flow said module marks the Forwarding Equivalence Class (FEC) and delivers the packets to a next module.

6. A content-aware congested control system for multiple protocol label switching (MPLS) routers according to claim 1 in which a classifier module in said switch mode classifies and queues packets in accordance with their respective priorities.

7. A content-aware congested control system for multiple protocol label switching (MPLS) routers according to claim 1 in which said multiple protocol label switching system (MPLS), in said egress mode remove a multiple protocol label switching system (MPLS) header and forwards to an internet protocol (IP) link based on a destination internet protocol (IP) address.

8. A content-aware congested control system for multiple protocol label switching (MPLS) routers according to claim 6 in which said classifier module maintains a priority of traffic flows until subsequent internet protocol (IP) hop.

9. A content-aware congested control system for multiple protocol label switching (MPLS) routers according to claim 7 in which said multiple protocol label switching (MPLS) header includes 32 bits and a three bit experimental (EXP) field representing the primary level of the packets based on content carried in a payload.

10. A content-aware congested control method for a software (MPLS) router, said method including the steps of:
  analyzing all incoming packets from an interface for packet payload and information in a packet header;
  establishing a pre-determined policy for prioritizing packets;
  classifying packets based on mark values from a control aware routing module;
  directing packets carrying high priority multi-media packets to a highest priority cue, packets carrying low priority multi-media packets to a second highest priority cue and remaining traffic to a least priority cue;
  creating label switching pads (LSPs) on an out going interface;
  assigning appropriate labels and different experimented (EXP) bit values to three different flows of traffic;
  identifying priorities for said three flows of traffic;
  removing a multiple protocol label switching system (MPLS) header from said packets; and
  forwarding said packets to an internet protocol (IP) link based on a destination internet protocol (IP) address.

* * * * *